United States Patent
Muto et al.

(10) Patent No.: US 7,051,726 B1
(45) Date of Patent: May 30, 2006

(54) CONTROL DEVICE FOR INTERNAL COMBUSTION ENGINE

(75) Inventors: Harufumi Muto, Nishikamo-gun (JP); Yuichiro Ido, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/271,857

(22) Filed: Nov. 14, 2005

(30) Foreign Application Priority Data

Nov. 16, 2004 (JP) .............................. 2004-331713

(51) Int. Cl.
*F02D 41/10* (2006.01)
*F02D 9/00* (2006.01)

(52) U.S. Cl. ....................... 123/684; 123/399

(58) Field of Classification Search ................ 123/350, 123/399, 492, 684
See application file for complete search history.

(56) References Cited

U.S. PATENT DOCUMENTS 6,615,812 B1 * 9/2003 Wild et al. ................. 123/683
6,662,640 B1 * 12/2003 Yagi ........................... 73/118.2
6,868,327 B1 * 3/2005 Muto ........................... 701/103

FOREIGN PATENT DOCUMENTS

JP      A 5-65845        3/1993
JP      A 2001-41095     2/2001

* cited by examiner

*Primary Examiner*—Erick Solis
(74) *Attorney, Agent, or Firm*—Oliff & Berridge, PLC (57) ABSTRACT

A target value of an engine load ratio is calculated. A target throttle opening required for making the actual engine load ratio equal to the target engine load ratio is calculated on the basis of an intake pipe pressure which is a pressure in the intake passage downstream of the throttle valve. It is judged whether the target throttle opening can be realized by a step motor. A final target throttle opening is set to a maximum or minimum throttle opening which can be realized by the step motor when it is judged that the calculated target throttle opening cannot be realized by the step motor. The step motor drives the throttle valve so that the actual throttle opening is made equal to the final target throttle opening, and the intake pipe pressure is estimated on the basis of the final target throttle opening.

8 Claims, 6 Drawing Sheets

Fig. 8

CONTROL DEVICE FOR INTERNAL COMBUSTION ENGINE

BACKGROUND OF THE INVENTION

1. Field of the Invention

The present invention relates to a control device for an internal combustion engine.

2. Related Art

There is known an internal combustion engine in which a target intake air amount is calculated, an intake pipe pressure, which is a pressure in an intake passage downstream of a throttle valve, is estimated on the basis of a throttle opening, a target throttle opening required for making the actual intake air amount equal to the target intake air amount, is calculated on the basis of the estimated intake pipe pressure, and the throttle valve is driven by an actuator so that the actual throttle opening is made equal to the target throttle opening (see Japanese Unexamined Patent Publication No. 5-65845).

There is a limit in the changing rate or the changeable amount of the throttle opening by the actuator. Therefore, when the engine is rapidly accelerated and thereby the target throttle opening increases greatly, for example, there may be a case in which the actual throttle opening is not made equal to the target throttle opening, or the target throttle opening is not realized. However, the above-mentioned engine considers that the actual throttle opening is made equal to the target value, and then calculates the intake pipe pressure on the basis of the target throttle opening. As a result, there may be a case in which it is impossible to accurately estimate the intake pipe pressure and, therefore, it is impossible to accurately calculate the target throttle opening.

SUMMARY OF THE INVENTION

An object of the present invention is to provide a control device for an internal combustion engine capable of accurately obtaining the target throttle opening, and of accurately conducting the engine control.

According to the present invention, there is provided a control device for an internal combustion engine having an intake passage and a throttle valve arranged in the intake passage, the control device comprising: target air amount calculating means for calculating a target value of an intake air amount; estimating means for estimating an intake pipe pressure which is a pressure in the intake passage downstream of the throttle valve; target throttle opening calculating means for calculating a target throttle opening required for making the actual intake air amount equal to the target intake air amount, on the basis of the intake pipe pressure estimated by the estimating means; driving means for driving the throttle valve; judging means for judging whether the target throttle opening can be realized by the driving means; and setting means for setting a final target throttle opening to a maximum or minimum throttle opening which can be realized by the driving means when it is judged that the target throttle opening cannot be realized by the driving means; wherein the driving means drives the throttle valve so that the actual throttle opening is made equal to the final target throttle opening, and wherein the estimating means estimates the intake pipe pressure on the basis of the final target throttle opening.

The present invention may be more fully understood from the description of the preferred embodiments according to the invention as set forth below, together with the accompanying drawings.

DESCRIPTION OF THE PREFERRED EMBODIMENTS

Figure 1:
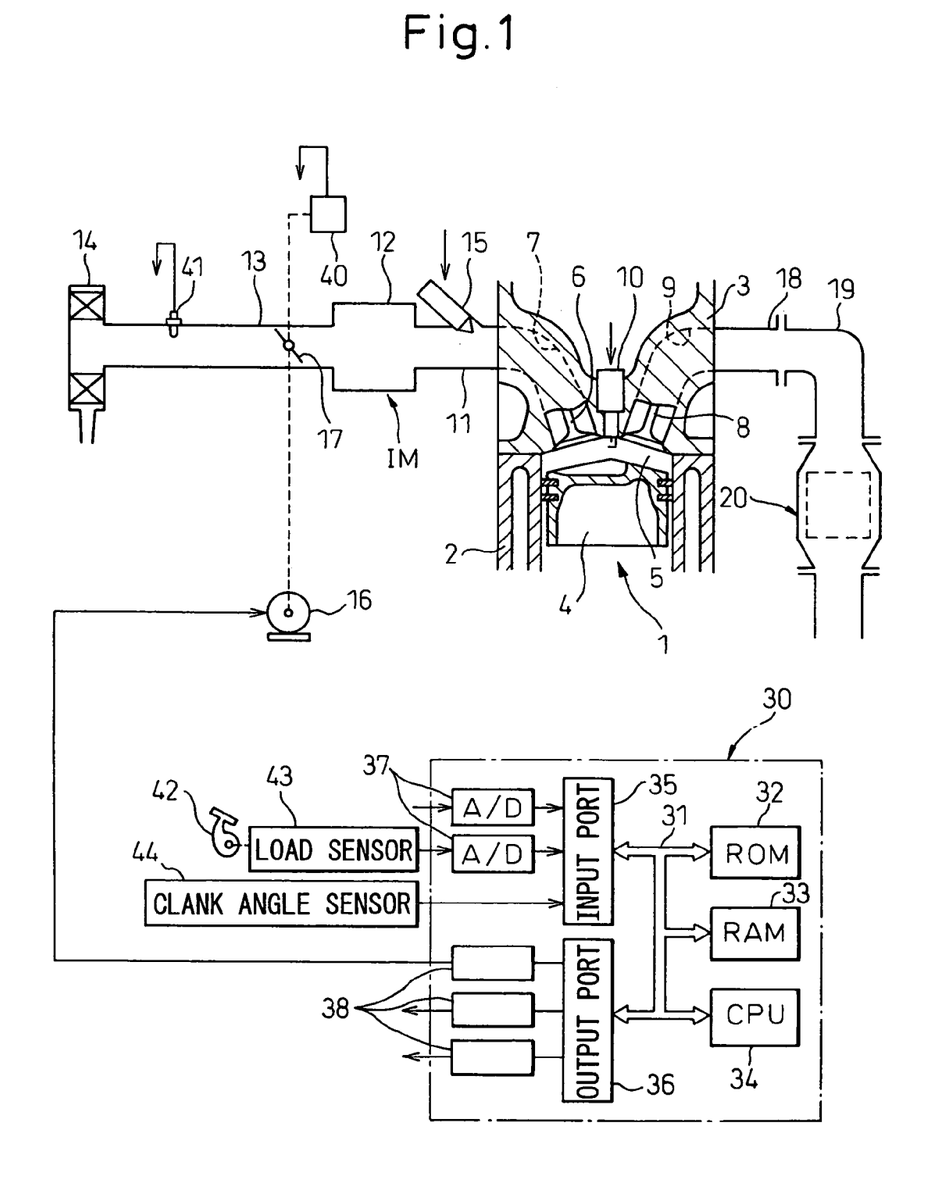
FIG. 1 shows an overall view of an internal combustion engine.

FIG. 1 shows a case in which the present invention is applied to an internal combustion engine of a spark ignition type. Alternatively, the present invention may also be applied to an internal combustion engine of a compression ignition type.

Referring to FIG. 1, the reference numeral 1 designates an engine body having four cylinders, for example, 2 designates a cylinder block, 3 designates a cylinder head, 4 designates a piston, 5 designates a combustion chamber, 6 designates intake valves, 7 designates intake ports, 8 designates exhaust valves, 9 designates exhaust ports and 10 designates a spark plug. The intake ports 7 are connected to a surge tank 12 through corresponding intake branches 11, and the surge tank 12 is connected to an air cleaner 14 through an intake duct 13. A fuel injector 15 is arranged in each intake branch 11, and a throttle valve 17 driven by a step motor 16 is arranged in the intake duct 13. Note that the intake duct 13 downstream of the throttle valve 17, the surge tank 12, the intake branches 11, and the intake ports 7 are referred to as an intake pipe IM, in the present specification.

On the other hand, the exhaust ports 9 are connected via an exhaust manifold 18 and an exhaust pipe 19 to a catalytic converter 20, and the catalytic converter 20 is communicated to the outside air via a muffler (not shown).

An electronic control unit 30 is constituted of a digital computer including a ROM (read-only memory) 32, a RAM (random access memory) 33, a CPU (microprocessor) 34, an input port 35 and an output port 36, which are connected to each other through a bidirectional bus 31. A throttle opening sensor 40 is attached to the throttle valve 17 for detecting an opening of the throttle valve 17, i.e., a throttle opening $\theta t$. An air flow meter 41 is attached to the intake duct 13 upstream of the throttle valve 17 for detecting a flow rate of intake air flowing through the intake passage of the engine. The air flow meter 41 has a built-in atmospheric temperature sensor for detecting the atmospheric temperature Ta (K). Also, an accelerator pedal 42 is connected with a load sensor 43 for detecting a depression ACC of the accelerator pedal 42. The depression ACC of the accelerator pedal 42 represents a required load. The output voltages of the sensors 40, 41 and 43 are input through corresponding A/D converters 37 to the input port 35. Further, the input port 35 is connected with a crank angle sensor 44 for generating an output pulse for each rotation of 30°, for example, of the crankshaft. CPU 34 calculates the engine speed NE on the basis of the output pulse from the crank angle sensor 44. On the other hand, the output port 36 is connected through corresponding drive circuits 38 to the spark plug 10, the fuel injectors 15, and the step motor 16, which are controlled on the basis of the output signals from the electronic control unit 30.

Figure 2:
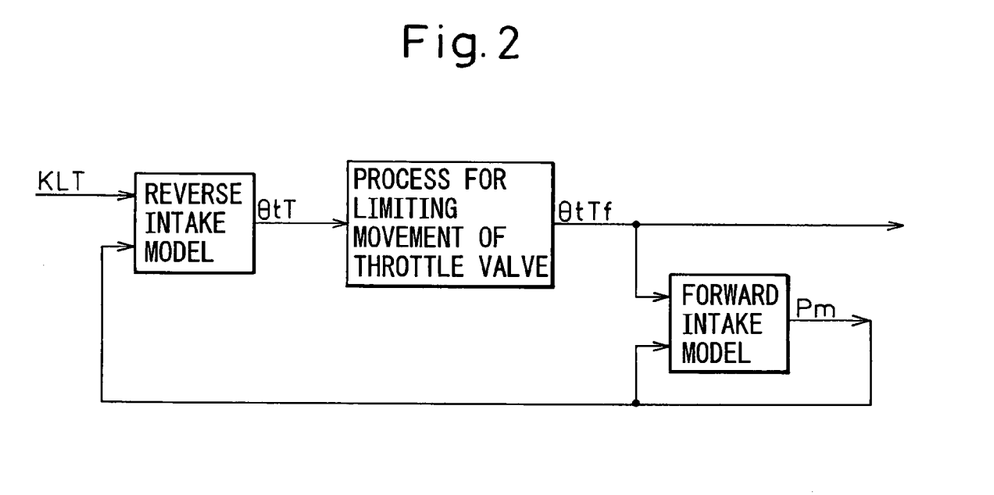
FIG. 2 shows a diagram for explaining an embodiment according to the present invention.

Referring to FIG. 2, in the embodiment according to the present invention, a target value KLT of an engine load ratio KL (%) representing an amount of intake air is first calculated. Then, a target throttle opening θtT, which is a throttle opening required to make the actual engine load ratio KL equal to the target value KLT, is calculated using the target engine load ratio KLT, an intake pipe pressure Pm (kPa) which is a pressure in the intake pipe IM, and a reverse intake model (explained later). Then, a final target throttle opening θtTf is calculated using a process for limiting the movement of a throttle valve (explained later). After that, the throttle valve 17 is driven so that the actual throttle opening θt is made equal to the final target opening θtTf.

On the other hand, the intake pipe pressure Pm realized when the actual throttle opening θt is made equal to the final target throttle opening θtTf is calculated using the final target opening θtTf and a forward intake mode (explained later). The target engine load ratio KLT, the target throttle opening θtT, and the final target throttle opening θtTf are calculated repeatedly, and the target throttle opening θtT in the next processing cycle is calculated using the thus calculated intake pipe pressure Pm.

As indicated at the beginning of this specification, there is a limit in the changing rate or the changeable amount of the throttle valve 17 by the step motor 16 and, therefore, there may a case in which it is impossible to make the actual throttle opening θt equal to the target throttle opening θtT.

So, in the embodiment according to the present invention, the final target throttle opening θtTf is calculated using the process for limiting the movement of the throttle valve 17 as in the following. Specifically, in the limiting process in the embodiment according to the present invention, it is judged whether the step motor 16 can realize the target throttle opening θtT. If it is judged that the step motor 16 cannot realize the target throttle opening θtT, the final target throttle opening θtTf is set to a maximum or minimum throttle opening which the step motor 16 can realize. In more detail, if the maximum and minimum throttle opening which the step motor 16 can realize are referred to as a changeable maximum throttle opening θtM and a changeable minimum throttle opening θtm, respectively, the changeable maximum and minimum throttle openings θtM and θtm are calculated from the following equations, respectively:

θtM=θtTfo+LMT

θtm=θtTfo−LMT where θtTfo represents that the final target throttle opening in the previous processing cycle or the current throttle opening, and LMT represents a maximum variation of the throttle opening achieved by the step motor 16. When the engine is accelerated and the target throttle opening θtT calculated using the reverse intake model is larger than the changeable maximum throttle opening θtM, the final target throttle opening θtTf is set to the changeable maximum opening θtM. When the engine is decelerated and the target throttle opening θtT is smaller than the changeable minimum throttle opening θtm, the final target throttle opening θtTf is set to the changeable minimum opening θtm.

In contrast, when it is judged that the step motor 16 can realize the target throttle opening θtT, the final target opening θtTf is set to the target opening θtT.

In the embodiment according to the present invention, the intake pipe pressure Pm is calculated on the basis of the final target throttle opening θtTf, rather than the target opening θtT. This ensures an accurate calculation of the intake pipe pressure Pm.

The above-mentioned engine load ratio KL is defined by the following equation (1), for example:

$$KL = \frac{Mc}{\frac{DSP}{NCYL} \cdot \rho astd} \cdot 100 \tag{1}$$

where Mc represents an in-cylinder charged air amount (gram) which is an amount of air having been charged into each cylinder when the intake stroke is completed; DSP represents the displacement of the engine (liter); NCYL represents the number of cylinders; and ρastd represents density of air (=approximately 1.2 g/liter) at standard conditions (1 atm and 25° C.).

If a flow rate of air sucked from the intake pipe IM into the cylinder CYL is referred to as an in-cylinder intake air flow rate mc (gram/sec), the in-cylinder charged air amount Mc is expressed by the following equation (2):

$$Mc = mc \cdot tiv \tag{2}$$

where tiv represents a time period (sec) required for each cylinder to conduct one intake stroke.

By replacing the coefficients together with kk, the engine load ratio KL can also be expressed by the following equation (3):

$$KL = kk \cdot mc \tag{3}$$

The target engine load ratio KLT may be calculated on the basis of the depression ACC of the accelerator pedal 42. The target engine load ratio KLT in this case is stored in the ROM 32 in advance, in the form of a map shown in FIG. 3.

On the other hand, the reverse intake model and the forward intake model are calculation models modeling the intake air flow. Next, the forward intake model will be explained.

Figure 4A:
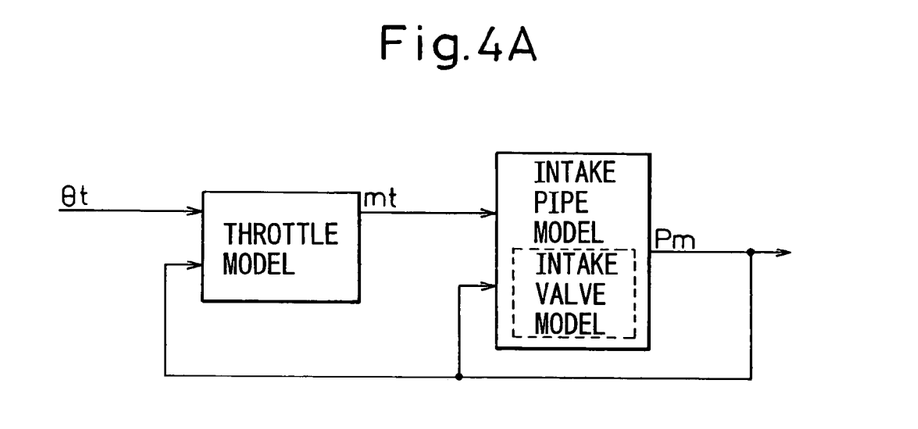
FIGS. 4A and 4B show diagrams for explaining a forward intake model and a reverse intake model, respectively.

In the embodiment according to the present invention, the forward intake model is constituted by a throttle model, an intake pipe model, and an intake valve model, as shown in FIG. 4A.

The throttle model will first be explained. The throttle model is a calculation model which models the intake air flow passing through the throttle valve 17. Note that the temperature of the air in the intake pipe IM is referred to as an intake pipe temperature Tm (K).

Figure 5A:
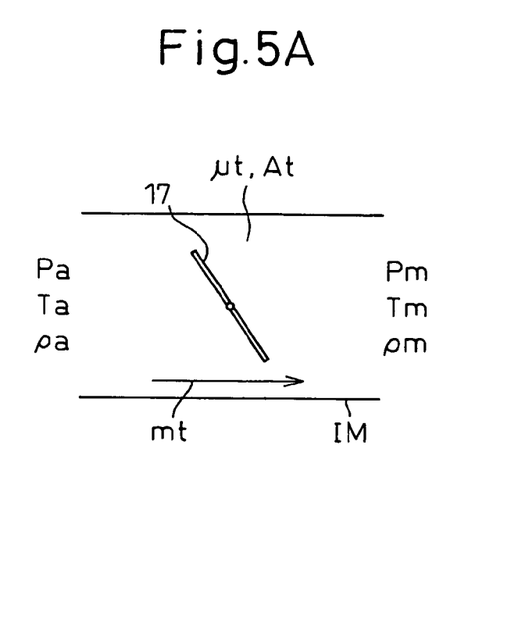
FIGS. 5A and 5B show diagrams for explaining each calculation model.

As shown in FIG. 5A, assuming that a pressure and a temperature upstream of the throttle valve 17 are the atmospheric pressure Pa and the atmospheric temperature Ta, respectively, and that the pressure and the temperature downstream of the throttle valve 17 are the intake pipe pressure Pm and the intake pipe temperature Tm, respectively, a throttle valve passing-through air flow rate mt (gram/sec), which is an air flow rate passing through the throttle valve 17, is expressed by the following equation (4), using the linear velocity vt (m/sec) of air passing through the throttle valve 17:

$$mt = \mu t \cdot At \cdot vt \cdot \rho m \tag{4}$$

where μt represents a flow coefficient at the throttle valve 17, At represents an opening area (m²) of the throttle valve 17, and ρm represents density (kg/m³) of air downstream of the throttle valve 17 or in the intake pipe IM. Note that the flow coefficient μt and the opening area At are functions of the throttle opening θt, respectively.

Further, the energy conservation law regarding air upstream and downstream of the throttle valve 17 is expressed by the following equation (5):

$$\frac{v^2}{2} + Cp \cdot Tm = Cp \cdot Ta \tag{5}$$

where Cp represents the specific heat at a constant air pressure.

Furthermore, considering that, at infinity upstream of the throttle valve 17, the cross sectional area of the intake pipe IM is infinite large and the air flow rate is zero, the momentum conservation law regarding air upstream and downstream the throttle valve 17 is expressed by the following equation (6):

$$\rho m \cdot v^2 = Pa - Pm \tag{6}$$

Figure 6:
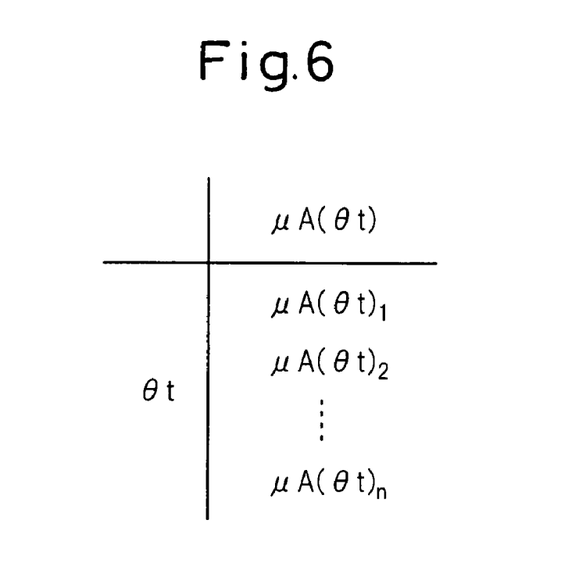
FIG. 6 shows a map illustrating $\mu A(\theta t)$.

Accordingly, the throttle valve passing-through air flow rate mt is expressed by the following equation (7) from the state equation at the upstream of the throttle valve 17 (Pa=ρa·R·Ta, where ρa represents density (kg/m³) of air at the upstream of the throttle valve 17 or in the atmosphere, and R represents the gas constant), the state equation at the downstream of the throttle valve 17 (Pm=ρm·R·Tm), and the above-mentioned equations (4), (5), and (6):

$$mt = \mu A(\theta t) \cdot \frac{Pa}{\sqrt{R \cdot Ta}} \cdot \Phi\left(\frac{Pm}{Pa}\right)$$

$$\Phi\left(\frac{Pm}{Pa}\right) = \begin{cases} \sqrt{\frac{\kappa}{2 \cdot (\kappa+1)}} & \cdots \frac{Pm}{Pa} \leq \frac{1}{\kappa+1} \\ \sqrt{\left\{\frac{\kappa-1}{2 \cdot \kappa} \cdot \left(1 - \frac{Pm}{Pa}\right) + \frac{Pm}{Pa}\right\} \cdot \left(1 - \frac{Pm}{Pa}\right)} & \cdots \frac{Pm}{Pa} > \frac{1}{\kappa+1} \end{cases} \tag{7}$$

where μA(θt) represents a function of the throttle opening θt expressing the flow coefficient μt and opening area At together. The function μA(θt) is obtained from experiments in advance, and is stored in the ROM 32 in the form of a map as shown in FIG. 6.

The throttle valve passing-through air flow rate mt calculated from the equation (7) represents a throttle valve passing-through air flow rate realized when the intake pipe pressure is equal to Pm and, at this time, the throttle opening is turned to θt.

Next, the intake pipe model will be explained. The intake pipe model is a calculation model modeling the intake air flow in the intake pipe IM.

Figure 5B:
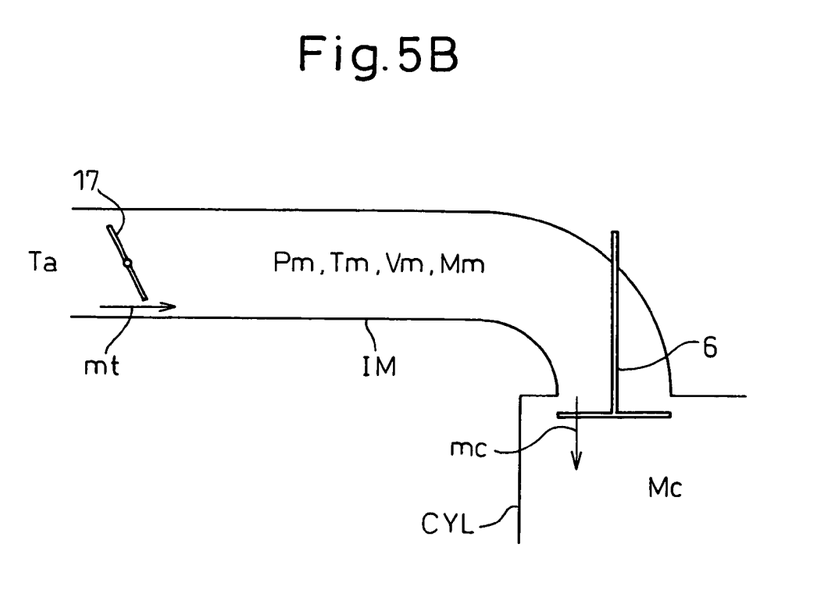

The intake pipe model of the embodiment according to the present invention focuses on the mass conservation law and the energy conservation law regarding the intake pipe IM. Specifically, the flow rate of air entering the intake pipe IM is equal to the throttle valve passing-through air flow rate mt and the flow rate of air exiting from the intake pipe IM is equal to the in-cylinder intake air flow rate mc, as shown in FIG. 5B, and therefore, the mass conservation law and the energy conservation law regarding the intake pipe IM are expressed by the following equations (8) and (9), respectively:

$$\frac{dMm}{dt} = mt - mc \tag{8}$$

$$\frac{d(Mm \cdot Cv \cdot Tm)}{dt} = Cp \cdot mt \cdot Ta - Cp \cdot mc \cdot Tm \tag{9}$$

where Mm represents an amount of air (in grams) existing in the intake pipe IM, t represents time, Vm represents a volume (m³) of the intake pipe IM, and Cv represents the specific heat at constant volume of air.

The equations (8) and (9) can be rewritten to the following equations (10) and (11), respectively, using the state equation (Pm·Vm=Mm·R·Tm), Mayer's relation (Cp=Cv+R), the specific heat ratio κ (=Cp/Cv), and a pressure-temperature ratio PBYT (=Pm/Tm):

$$\frac{dPBYT}{dt} = \frac{R}{Vm} \cdot (mt - mc) \tag{10}$$

$$\frac{dPm}{dt} = \kappa \cdot \frac{R}{Vm} \cdot (mt \cdot Ta - mc \cdot Tm) \tag{11}$$

In the actual calculation, the equations (10) and (11) are expressed as in the equations (12) and (13), respectively, using the time interval of calculation Δt and a parameter i expressing the number of calculation cycle:

$$PBYT(i) = PBYT(i-1) + \Delta t \cdot \frac{R}{Vm} \cdot (mt(i-1) - mc(i-1)) \tag{12}$$

$$Pm(i) = Pm(i-1) + \Delta t \cdot \kappa \cdot \frac{R}{Vm} \cdot (mt(i-1) \cdot Ta - mc(i-1) \cdot Tm(i-1)) \tag{13}$$

Further, the intake pipe temperature Tm is calculated from the following equation (14):

$$Tm(i) = \frac{Pm(i)}{PBYT(i)} \tag{14}$$

The intake pipe pressure Pm(i) calculated from the equation (13) represents an intake pipe pressure realized when the intake pipe pressure and temperature are equal to Pm(i−1) and Tm(i−1) and, at this time, air enters in the intake pipe IM by mt(i−1) and exits from the intake pipe IM by mc (i−1).

Next, the intake valve model will be explained. The intake valve model is a calculation model modeling the intake air flow passing through the intake valve 6.

Figure 7A:
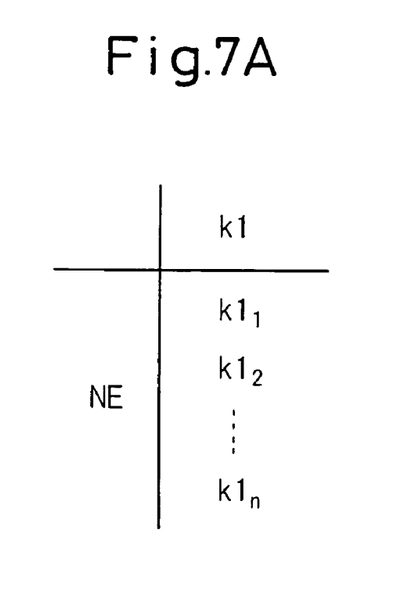
FIGS. 7A and 7B show maps illustrating k1 and k2, respectively.
Figure 7B:
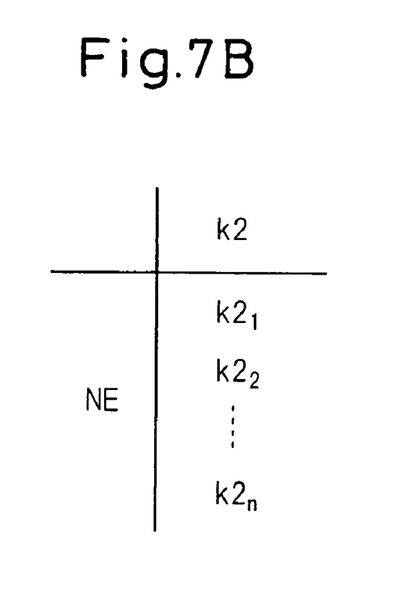

It has been experimentally and theoretically proved that there is a linear relationship between the in-cylinder intake air flow rate mc and the intake pipe pressure Pm or, more accurately, the intake pipe pressure Pm at the closing timing of the intake valve 6. The intake valve model of the embodiment according to the present invention focuses on this relationship and, therefore, the in-cylinder intake air flow rate mc is expressed by the following equation (15):

$$mc = k1 \cdot Pm - k2 \tag{15}$$

where k1 and k2 are constants set in accordance with the engine operating condition such as the engine speed NE, and are stored in the ROM 32 in advance in the form of maps shown in FIGS. 7A and 7B, respectively.

The in-cylinder intake air flow rate mc calculated from the equation (15) represents an in-cylinder intake air flow rate realized when the intake pipe pressure is equal to Pm.

Accordingly, the intake pipe pressure Pm, calculated from the equation (13) using the throttle valve passing-through air flow rate mt calculated from the equation (7) while (θt, Pm) in the equation (7) are replaced with (θtTf, Pmo), the in-cylinder intake air flow rate mc calculated from the equation (15), and the intake pipe temperature Tm calculated from the equations (12) and (14), represents an intake pipe pressure realized when the actual throttle opening θt is made equal to the final target throttle opening θtTf. Note that Pmo represents an intake pipe pressure Pm in the previous calculation cycle.

Figure 4B:
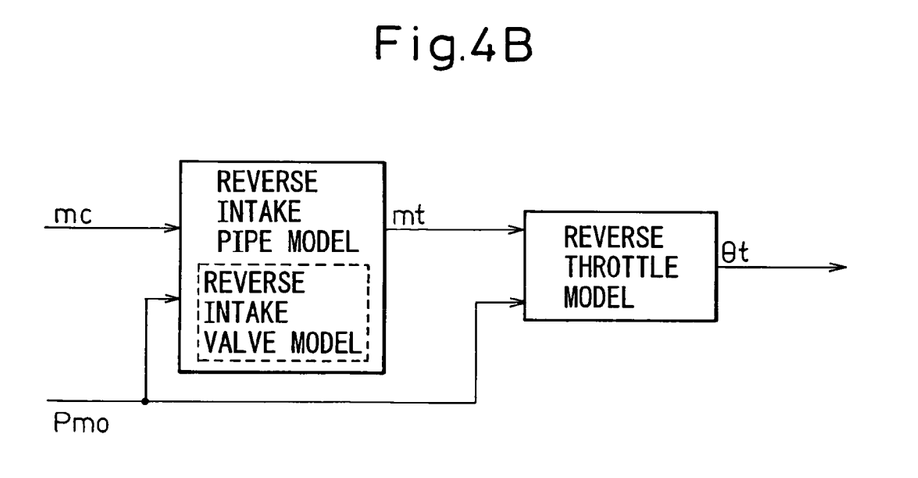

Next, the reverse intake model will be explained. In the embodiment according to the present invention, the reverse intake model is constituted by a reverse throttle model, a reverse intake pipe model, and a reverse intake valve model, as shown in FIG. 4B. The reverse throttle model, the reverse intake pipe model, and the reverse intake valve model are for performing calculations in reverse direction in the throttle model, the intake pipe model, and the intake valve model, respectively.

The reverse intake valve model will first be explained. In the reverse intake valve model, the intake pipe pressure Pm when the in-cylinder intake air flow rate is equal to mc is expressed by the following equation (16) derived from the equation (15):

$$Pm = \frac{mc + k2}{k1} \quad (16)$$

Next, the reverse intake pipe model will be explained. If an intake pipe pressure, realized when the intake pipe pressure and temperature are equal to Pmo and Tmo and, at this time, air enters in the intake pipe IM by mt and exits from the intake pipe IM by mc, is equal to Pm, the throttle valve passing-through air flow rate mt is expressed by the following equation (17) derived from the equation (13):

$$mt = \frac{1}{Ta} \cdot \left\{ (Pm - Pmo) \cdot \frac{Vm}{\Delta t \cdot \kappa \cdot R} + mc \cdot Tmo \right\} \quad (17)$$

Next, the reverse throttle model will be explained. The throttle opening θt when the throttle valve passing-through air flow rate is equal to mt is expressed by the following equation (18) derived from the equation (7):

$$\theta t = \mu A^{-1} \left( \frac{mt}{\frac{Pa}{\sqrt{R \cdot Ta}} \cdot \Phi\left(\frac{Pmo}{Pa}\right)} \right) \quad (18)$$

where $\mu A^{-1}$ represents an inverse function of $\mu A$.

Accordingly, the intake pipe pressure Pm, calculated from the equation (16) while mt in the equation (16) is replaced with mcT, represents a target value PmT of the intake pipe pressure Pm, where mcT represents a target value of the in-cylinder intake air flow rate mc corresponding to the target engine load ratio KLT. Further, the throttle valve passing-through air flow rate mt, calculated from the equation (17) while Pm in the equation (17) is replaced with PmT, represents a target value mtT of the throttle valve passing-through air flow rate mt. Furthermore, the throttle opening θt, calculated from the equation (18) while mt in the equation (18) is replaced with mtT, represents the target throttle opening θtT required for making the actual engine load ratio KL equal to the target engine load ratio KLT.

The target in-cylinder intake air flow rate mcT may be calculated from the following equation (19) derived from the equation (3):

$$mcT = \frac{KLT}{kk} \quad (19)$$

Figure 8:
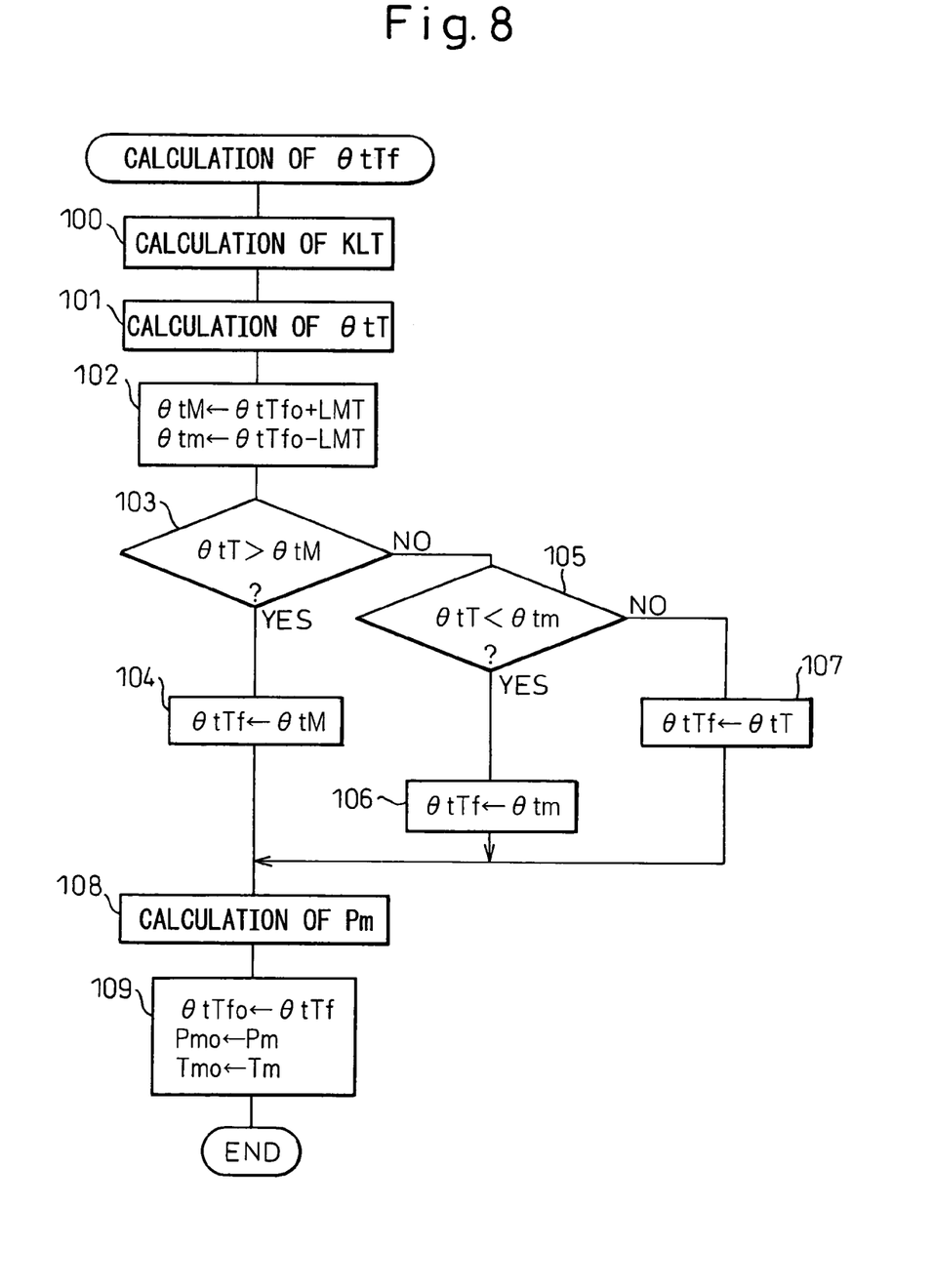
FIG. 8 shows a flowchart illustrating a routine for calculating a final target throttle opening $\theta tTf$, according to an embodiment of the present invention.

FIG. 8 shows a calculation routine of the final target throttle opening θtTf according to the embodiment of the present invention. This routine is executed by an interruption every predetermined time.

Figure 3:
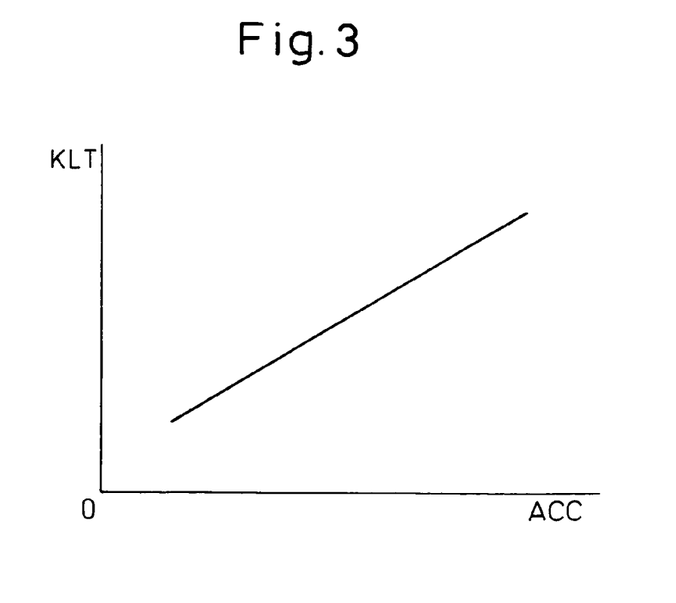
FIG. 3 shows a map illustrating KLT.

Referring to FIG. 8, in step 100, the target engine load ratio KLT is calculated from the map shown in FIG. 3. In the following step 101, the target throttle opening θtT is calculated using the reverse intake model. In the following step 102, the changeable maximum and minimum throttle openings θtM and θtm are calculated, respectively (θtM=θtTfo+LMT, θtm=θtTfo−LMT). In the following step 103, it is judged whether the target throttle opening θtT is larger than the changeable maximum throttle opening θtM. If θtT>θtM, the routine goes to step 104 where the final target throttle opening θtTf is set to the changeable maximum throttle opening θtM. Then, the routine goes to step 108. In contrast, if θtT≦θtM, the routine goes to step 105 where it is judged whether the target throttle opening θtT is smaller than the changeable minimum throttle opening θtm. If θtT<θtm, the routine goes to step 106 where the final target throttle opening θtTf is set to the changeable minimum throttle opening θtm. Then, the routine goes to step 108. If θtT≧θtm or θtm≦θtT≦θtM, the routine goes from step 105 to step 107 where the final target throttle opening θtTf is set to the target throttle opening θtT. Then, the routine goes to step 108.

In step 108, the intake pipe pressure Pm is calculated using the forward intake model. In the following step 109, (θtTf, Pm, Tm) calculated in the current processing cycle are replaced with (θtTfo, Pmo, Tmo), respectively.

According to the present invention, it is possible to provide a control device for an internal combustion engine capable of accurately obtaining the target throttle opening, and of accurately conducting the engine control.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A control device for an internal combustion engine having an intake passage and a throttle valve arranged in the intake passage, the control device comprising:

target air amount calculating means for calculating a target value of an intake air amount;

estimating means for repeatedly estimating an intake pipe pressure which is a pressure in the intake passage downstream of the throttle valve;

target throttle opening calculating means for calculating a target throttle opening required for making the actual intake air amount equal to the target intake air amount, on the basis of the intake pipe pressure;

driving means for driving the throttle valve;

judging means for judging whether the target throttle opening can be realized by the driving means; and setting means for setting a final target throttle opening to a maximum or minimum throttle opening which can be realized by the driving means when it is judged that the target throttle opening cannot be realized by the driving means;

wherein the driving means drives the throttle valve so that the actual throttle opening is made equal to the final target throttle opening, and wherein the estimating means estimates the new intake pipe pressure on the basis of the final target throttle opening.

2. A control device for an internal combustion engine as described in claim 1, wherein the setting means sets the final target throttle opening to the target throttle opening calculated by the target throttle opening calculating means when it is judged that the target throttle opening can be realized by the driving means.

3. A control device for an internal combustion engine as described in claim 1, wherein the estimating means estimates:

a throttle valve passing-through air flow rate, which is an air flow rate passing through the throttle valve, on the basis of the previously-estimated intake pipe pressure and the final target throttle opening;

an in-cylinder intake air flow rate, which is a flow rate of air sucked from the intake passage into the cylinder, on the basis of the previously-estimated intake pipe pressure; and the new intake pipe pressure on the basis of the previously-estimated intake pipe pressure, the estimated throttle valve passing-through air flow rate, and the estimated in-cylinder intake air flow rate.

4. A control device for an internal combustion engine as described in claim 1, wherein the target throttle opening calculating means calculates:

a target value of an in-cylinder intake air flow rate, which is a flow rate of air sucked from the intake passage into the cylinder, on the basis of the target intake air amount;

a target value of the intake pipe pressure on the basis of the calculated target in-cylinder intake air flow rate;

a target value of a throttle valve passing-through air flow rate, which is an air flow rate passing through the throttle valve, on the basis of the previously-estimated intake pipe pressure and the calculated target intake pipe pressure; and the target throttle opening on the basis of the previously-estimated intake pipe pressure and the calculated target throttle valve passing-through air flow.

5. A control device for an internal combustion engine as described in claim 1, wherein the maximum throttle opening which can be realized by the driving means is obtained by adding a maximum variation of the throttle opening to the current throttle opening, and it is judged that the target throttle opening calculated by the target throttle opening calculating means cannot be realized by the driving means when the target throttle opening is larger than the maximum throttle opening which can be realized by the driving means.

6. A control device for an internal combustion engine as described in claim 1, wherein the minimum throttle opening which can be realized by the driving means is obtained by subtracting a maximum variation of the throttle opening from the current throttle opening, and it is judged that the target throttle opening calculated by the target throttle opening calculating means cannot be realized by the driving means when the target throttle opening is smaller than the minimum throttle opening which can be realized by the driving means.

7. A control device for an internal combustion engine as described in claim 1, wherein the target air amount calculating means calculates the target intake air amount on the basis of a required engine load.

8. A control device for an internal combustion engine as described in claim 1, wherein the driving means comprises a step motor.

* * * * *